June 9, 1936.  J. CULEMEYER  2,043,507
MEANS FOR TRANSPORTING RAILWAY VEHICLES BY ROAD
Filed May 2, 1934  2 Sheets-Sheet 1

INVENTOR.
JOHANN CULEMEYER.
ATTORNEY.

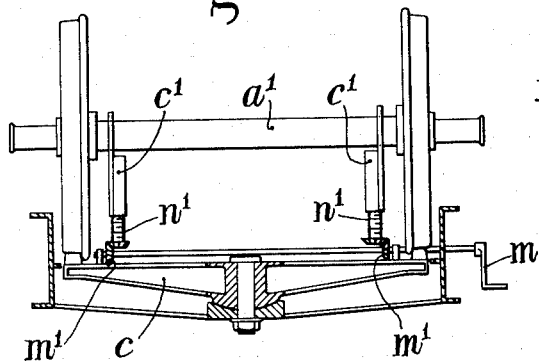
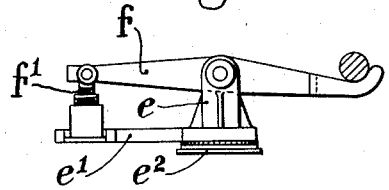
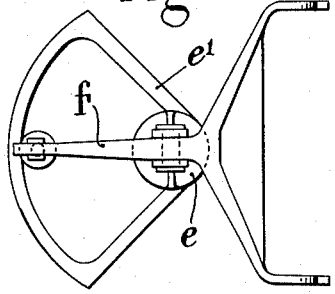
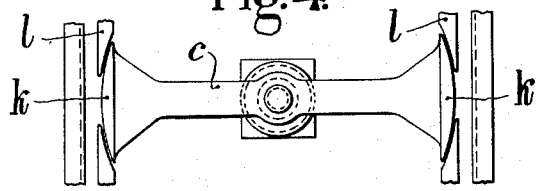
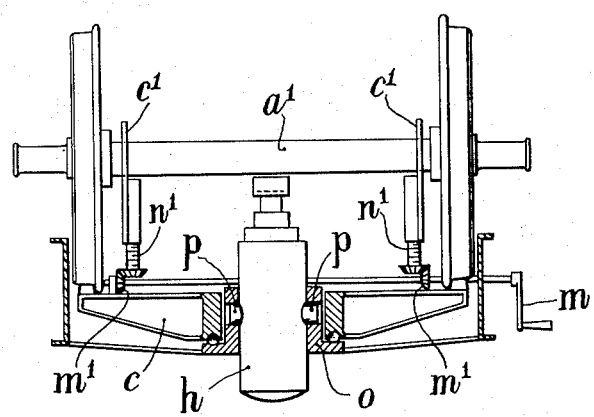
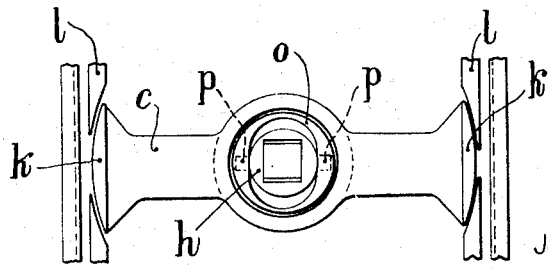

UNITED STATES PATENT OFFICE 2,043,507

MEANS FOR TRANSPORTING RAILWAY VEHICLES BY ROAD

Johann Culemeyer, Berlin-Charlottenburg, Germany, assignor to Gothaer Waggonfabrik, Aktiengesellschaft, Gotha, Germany Application May 2, 1934, Serial No. 723,604
In Germany May 6, 1933

6 Claims. (Cl. 280—33.2)

For transporting railway vehicles by road it is a common practice to use a tractor having a trailer connected thereto by a pivoted draw bar, the front wheels of the railway vehicle being placed on the tractor and the rear wheels on the trailer.

According to my invention a tractor and a trailer are used, with the railway vehicle forming the sole connection between them for purposes of traction on the road. For this purpose I provide the tractor with a support which is rotatable about a vertical axis and is adapted to engage and carry the front axle of the railway vehicle, and I provide the trailer frame with means for engaging and carrying the rear axle.

Examples of tractors and trailers constructed according to the invention are shown in the accompanying drawings.

Figs. 3 and 4 are respectively a vertical section and a plan view, to a larger scale, of mechanism belonging to the tractor shown in Figs. 1 and 2.

Figs. 7 and 8 are respectively a side view and a plan view, to a larger scale, of mechanism belonging to the tractor shown in Figs. 5 and 6.

Figs. 10 and 11 are respectively a vertical section and a plan view, to a larger scale, of mechanism belonging to the tractor shown in Fig. 9.

Referring first to Figs. 1 to 4, $a$ is a railway truck, with a front axle $a^1$, and $b^1$ is the tractor and $b^2$ the trailer. On the tractor there is a turn table $c$, best shown in Figs. 3 and 4, with two notched seats $c^1$ thereon for engaging the axle $a^1$. On the frame of the trailer $b^2$ there are two notched seats $c^2$ for engaging the rear axle $a^2$. The turn table $c$ is a flat bar extending across the tractor, pivoted at the center and having at its ends short rail sections $k$ adapted to fit into gaps in rails $l$ on which the railway truck is run on to the tractor. The two notched supports $c^1$ for the axle $a^1$ are carried by screw spindles $n^1$ engaging screw threaded sleeves fixed to the supports, so that the latter can be screwed up and down on the spindles. When lowered, the supports allow the axle to be placed over them, and when raised they engage and lift it. The spindles are rotated by means of bevel gears $m^1$ on a shaft rotated by a hand crank $m$.

The seats $c^2$ on the trailer can be raised and lowered similarly.

For mounting the truck on the tractor and trailer these are placed closely together in line with a rail track on a platform $d$, on to which the truck is run. The truck is then pushed along the rails so that its front wheels run over the trailer on to the tractor, the seats $c^1$ and $c^2$ being lowered for this purpose. Then the seats $c^1$ are raised so that they engage the truck axle $a^1$ and the tractor is moved away from the trailer, dragging the truck so that the rear wheels thereof run on to the trailer, and the seats $c^2$ are raised so that they engage the axle $a^2$.

In the modification shown in Figs. 5 to 8 the tractor, designated $b^3$, has thereon a rotatable pillar $e$ supporting a lever $f$ projecting rearwardly from the tractor and having its rear end curved for engaging under the axle $a^1$. A screw spindle $f^1$ is connected by a link to the front end of the lever $f$ and works in a screw-threaded socket, which can be rotated by hand, e. g. means of spokes, for raising or lowering the front end of the lever and thereby lowering or raising the rear end. The pillar $e$ is rotatable on a support $e^2$, and a sector $e^1$ fixed to the foot of the pillar supports the screw device $f^1$. The trailer is similar to that shown in Fig. 1.

For mounting the truck the rear end of the lever $f$ may be lowered so that it can be placed under the axle $a^1$ when the truck wheels are on the ground, the lever being then rocked by means of the screw spindle so that it supports the front end of the truck with the wheels off the ground. The truck may then be backed so that the rear wheels run up a portable ramp $g$ on to the trailer $b^2$.

Figure 1:
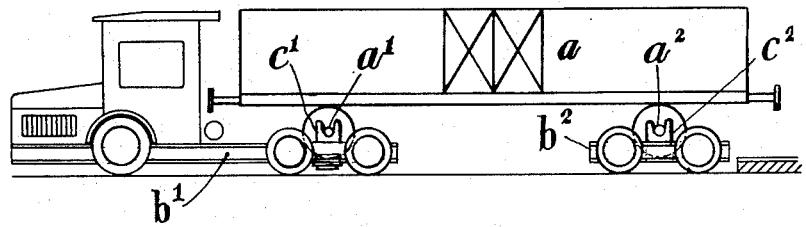
Fig. 1 is a side view showing one form of construction.
Figure 2:
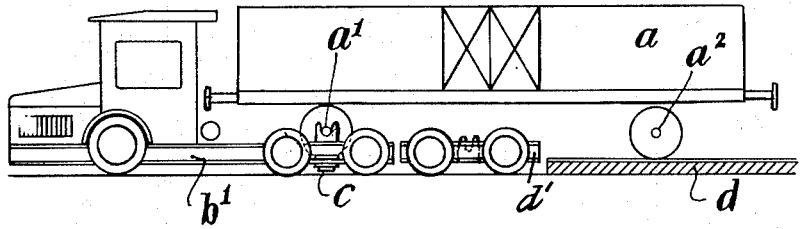
Fig. 2 illustrates the method of placing a railway truck on the tractor and trailer shown in Fig. 1.
Figure 5:
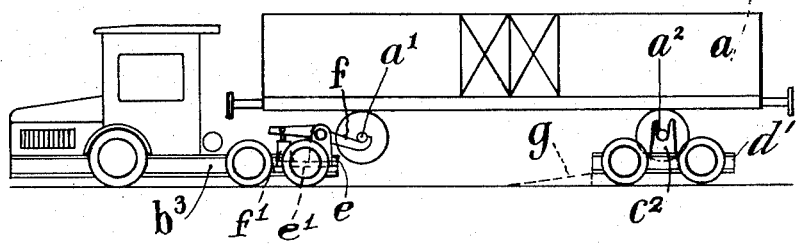
Fig. 5 is a side view showing another form of construction.
Figure 6:
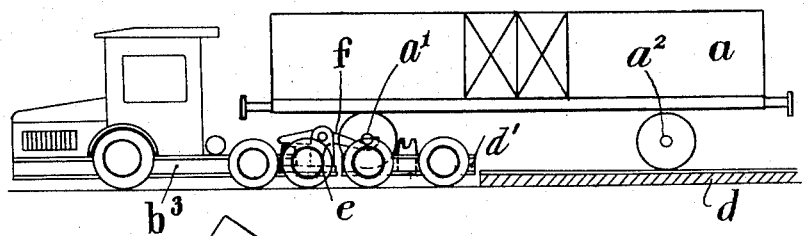
Fig. 6 illustrates a method of mounting the truck which may be adopted in this case.
Figure 9:
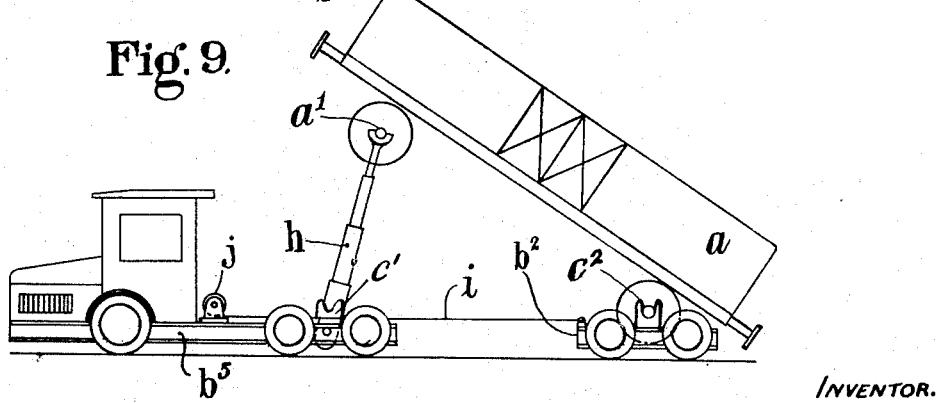
Fig. 9 shows a modification in which the tractor has a telescopic jack for tipping the truck.

Figs. 9, 10 and 11 illustrate a modification in which the tractor, designated $b^5$ has thereon a rotatable telescopic jack $h$, adapted to be extended by pneumatic or hydraulic power for tipping the truck. The tipping is assisted by pulling the trailer towards the tractor by means of a rope $i$ and winch $j$. The jack $h$ has gudgeons $p$, by means of which it is mounted in an approximately elliptical bore in a bearing $o$, and this bearing forms the pivot of a turntable $c$ similar to that described with reference to Figs. 3 and 4.

What I claim as my invention and desire to secure by Letters Patent of the United States is:—

1. A road conveyance for transporting a railway vehicle having a front and rear axle, comprising in combination a tractor and a trailer movable towards and away from each other when unloaded, a seating on said tractor rotatable about a vertical pivot and adapted to engage the front axle of said railway vehicle, and a seating on said trailer adapted to engage the rear axle of said railway vehicle.

2. A road conveyance for transporting a railway vehicle having a front axle and a rear axle, comprising in combination a tractor and a trailer movable towards and away from each other when unloaded, a carrier on said tractor rotatable about a vertical pivot and adapted to support the front axle of said railway vehicle, a seating on said trailer adapted to engage the rear axle of said railway vehicle and form a fulcrum about which said vehicle can be tilted, and means on said tractor for lifting the front axle of said railway vehicle.

3. A road conveyance for transporting a railway vehicle having a front axle and a rear axle, comprising in combination a tractor and a trailer movable towards and away from each other when unloaded, a support on said tractor rotatable about a vertical pivot, a lever on said support, rotatable about a horizontal pivot and adapted to support and lift the front axle of said railway vehicle, and a seating on said trailer, adapted to support the rear axle of said railway vehicle and to form a fulcrum about which said vehicle can be tilted.

4. A road conveyance for transporting a railway vehicle having a front axle and a rear axle, comprising in combination a tractor and trailer movable towards and away from each other, when unloaded, a carrier on said tractor rotatable about a vertical pivot and adapted to support the front axle of said railway vehicle, a seating on said trailer adapted to engage the rear axle of said railway vehicle and form a fulcrum about which said vehicle can be tilted, and a jack on said tractor for lifting the front axle of said railway vehicle.

5. A road conveyance for transporting a railway vehicle having a front axle and a rear axle, comprising in combination a tractor and a trailer movable towards and away from each other when unloaded, a carrier on said tractor rotatable about a vertical pivot and adapted to support the front axle of said railway vehicle, a seating on said trailer adapted to engage the rear axle of said railway vehicle and form a fulcrum about which said vehicle can be tilted, a jack on said tractor for lifting the front axle of said railway vehicle, and means for drawing said trailer towards said tractor.

6. A road conveyance for transporting a railway vehicle having a front axle and a rear axle, comprising in combination a tractor and a trailer movable towards and away from each other when unloaded, a carrier on said tractor rotatable about a vertical pivot and adapted to support the front axle of said railway vehicle, a seating on said trailer adapted to engage the rear axle of said railway vehicle and form a fulcrum about which said vehicle can be tilted, a jack on said tractor for lifting the front axle of said railway vehicle, a winch on said tractor and a rope connecting said trailer to said winch, whereby said trailer can be pulled towards said tractor.

JOHANN CULEMEYER.